(12) United States Patent
Allen et al.

(10) Patent No.: US 6,970,143 B2
(45) Date of Patent: Nov. 29, 2005

(54) HIGHLY COMPACT, PRECISION LIGHTWEIGHT DEPLOYABLE TRUSS WHICH ACCOMMODATES SIDE MOUNTED COMPONENTS

(75) Inventors: Bibb Bevis Allen, Palm Bay, FL (US); Dave C. Lenzi, Melbourne, FL (US); Thomas Jeffrey Harvey, Nederland, CO (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 10/801,995

(22) Filed: Mar. 16, 2004

(65) Prior Publication Data

US 2005/0206579 A1 Sep. 22, 2005

(51) Int. Cl.$^{7}$ ................................................ H01Q 1/08
(52) U.S. Cl. ......................... 343/880; 343/915; 52/108
(58) Field of Search ................................ 343/912, 915, 343/DIG. 2, 880, 882, 878; 52/108, 646

(56) References Cited

U.S. PATENT DOCUMENTS

| | | | | |
|---|---|---|---|---|
| 4,524,552 A | | 6/1985 | Hujsak | 52/108 |
| 4,587,777 A | | 5/1986 | Vasques et al. | 52/108 |
| 4,667,451 A | | 5/1987 | Onoda | 52/646 |
| 4,819,399 A | | 4/1989 | Onoda | 52/646 |
| 4,845,511 A | | 7/1989 | Grayson et al. | 343/915 |
| 4,923,355 A | | 5/1990 | Mancini | 414/339 |
| 4,962,827 A | | 10/1990 | Garnett | 182/2 |
| 5,054,466 A | | 10/1991 | White et al. | 126/436 |
| 5,085,018 A | * | 2/1992 | Kitamura et al. | 52/108 |
| 5,456,371 A | | 10/1995 | Klann | 212/338 |
| 5,990,851 A | | 11/1999 | Henderson et al. | 343/915 |
| 6,028,570 A | * | 2/2000 | Gilger et al. | 343/915 |
| 6,076,770 A | | 6/2000 | Nygren et al. | 244/158 |
| 6,219,009 B1 | | 4/2001 | Shipley et al. | 343/915 |
| 6,278,416 B1 | | 8/2001 | Harless | 343/915 |
| 6,343,442 B1 | | 2/2002 | Marks | 52/71 |
| 6,441,801 B1 | | 8/2002 | Knight et al. | 343/915 |
| 6,542,132 B2 | | 4/2003 | Stern | 343/915 |

* cited by examiner

*Primary Examiner*—Hoang V. Nguyen
(74) *Attorney, Agent, or Firm*—Allen, Dyer, Doppelt, Milbrath & Gilchrist, P.A.

(57) ABSTRACT

A boom structure is deployable from a collapsed, stowable configuration to an elongated truss configuration. The boom structure contains a plurality of truss-forming multi-sided bays. A bay contains a pair of battens joined together at corner regions by foldable longerons. A side of a bay has a plurality of diagonal cord members crossing one another and connected to diagonally opposed corner regions of the side. When the longerons are in their folded positions, the battens are nested together against one another in a stacked arrangement and the diagonal cord members flex into a compact stowed configuration between adjacent battens. The stowed battens are compressed to each other at their corners to form a stowed structure capable of reacting loads.

16 Claims, 7 Drawing Sheets

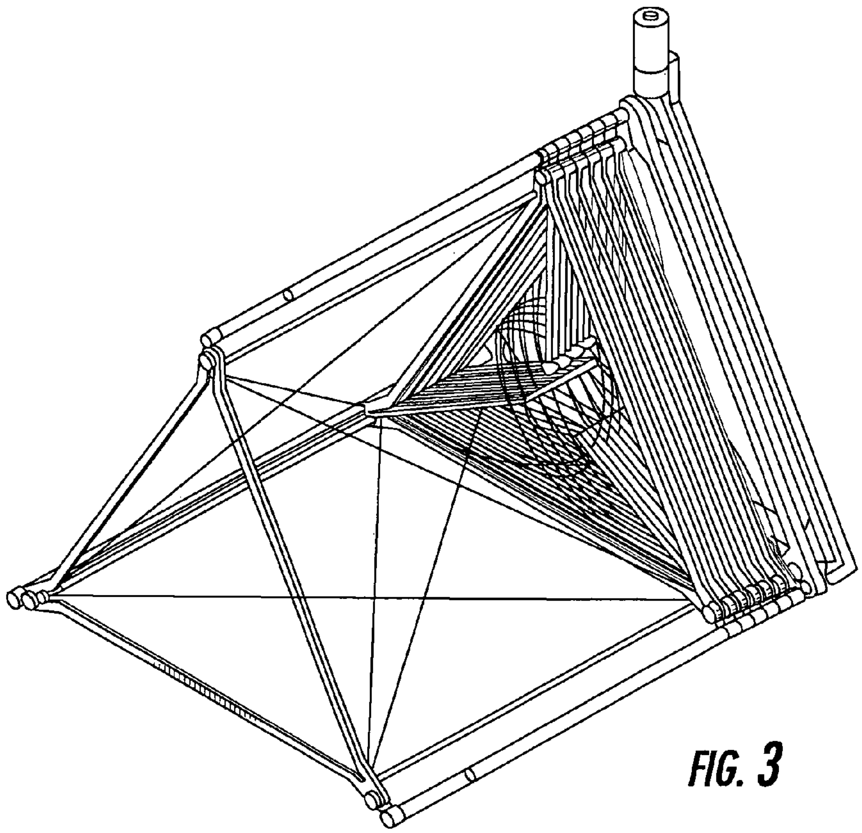
FIG. 3
FIG. 4
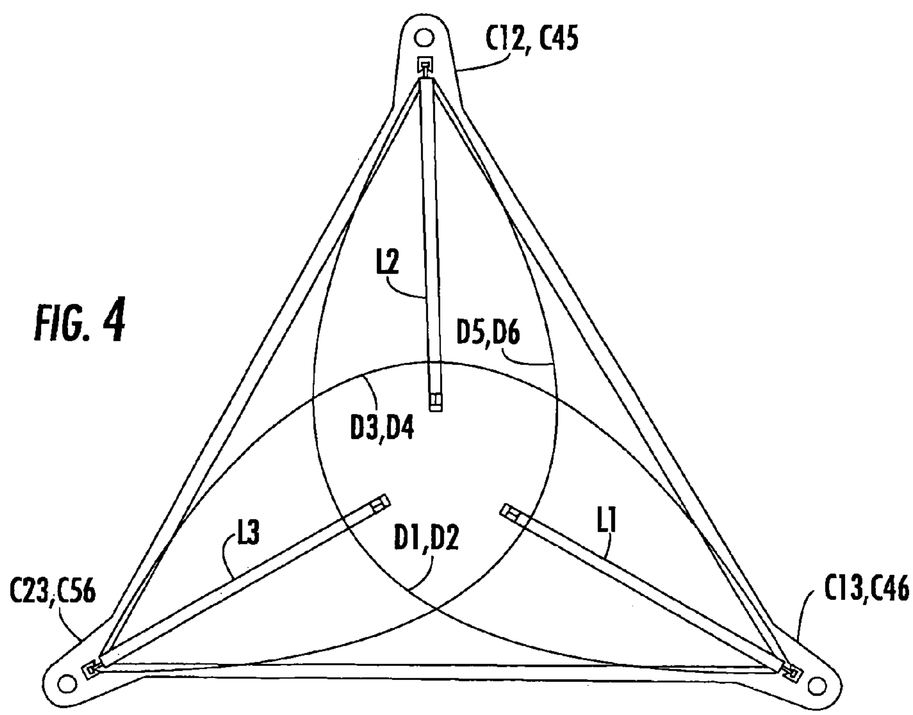

HIGHLY COMPACT, PRECISION LIGHTWEIGHT DEPLOYABLE TRUSS WHICH ACCOMMODATES SIDE MOUNTED COMPONENTS

FIELD OF THE INVENTION

The present invention relates in general to space-deployable structures, and is particularly directed to a lightweight truss structure which accommodates the side mounting of components in its deployed configuration, and which folds to a highly nested, compact stacked configuration when stowed.

BACKGROUND OF THE INVENTION

In order to transport and space-deploy large physical structures, such as antennas, solar reflectors and the like, using cost effective (small) launch vehicles, it is necessary that the underlying support architecture for the deployed structure be lightweight and compactly stowable in as small a payload volume as possible. Many of the space deployment architectures that have been proposed to date employ a relatively long (on the order of three hundred meters or more) rectilinear boom, that provides for the mounting of a variety of devices along its length. Moreover, many applications which use a boom require the boom to be extremely lightweight and have a high degree of stiffness or rigidity. This is particularly true in the case of large antennas, which need to be precisely deployed and must maintain geometry precision on orbit. For such applications it is also necessary that the deployment of the boom be rate and geometry controlled.

Unfortunately, the relatively large, high stiffness booms that have been proposed and deployed to date typically use canister mechanisms for their deployment that are relatively heavy and do not allow side mounting of payloads along the entire length of the structure. Telescoping booms are an alternative, yet like canister deployed structures, they have no side mounting capability. Inflatable structures, on the other hand, provide for highly compact stowage; however, once deployed they are subject to micro-meteoroid damage; they also lack geometric precision due to the fact that they have a relatively high coefficient of thermal expansion (CTE). To address the deployed geometry precision problem, rigidized inflatables have been suggested. However, these structures suffer from fiber breakage, a lack of deployment repeatability and final material characteristic consistency.

SUMMARY OF THE INVENTION

In accordance with the present invention, shortcomings of conventional space-deployable boom structures, such as those described above, are effectively obviated by means of a collapsible truss structure, that is rectilinearly deployable from a tightly nested, stowed configuration to an elongated truss configuration. As will be described, the truss structure of the present invention contains a plurality of foldable, truss-forming multi-sided bays. Each bay contains a pair of multi-sided (e.g., triangular) battens that are joined together at corner regions thereof by foldable longerons.

In addition, each side of a bay contains a plurality of flexible cord diagonal members that cross one another and connected to diagonally opposed corner regions of that side. When the longerons are in their folded positions, the battens are nested together against one another in a stacked arrangement and the flexible cord diagonal members flex into a compact stowed configuration between adjacent battens.

Each corner region of a batten includes a pair of flexible clamps that are configured to engage an elongated support member in the stowed configuration of the bay containing that batten. In the course of deployment of the bay outwardly from its stowed configuration, the clamps travel along and leave the elongated support member, and engage threads of an elevator screw that is coaxial with and extends outwardly from said elongated support member.

The elevator screw is coaxial with an elongated lead screw, which passes through said elongated support member, such that rotation of said elongated lead screw initially causes linear travel of the elevator screw over a prescribed distance, sufficient to deploy the outermost bay of the truss. The elevator screw then becomes fixedly engaged with or slaved to the lead screw. Once this occurs, further rotation of the lead screw causes rotation of the elevator screw therewith. The clamps travel along the elevator screw until they leave the elevator screw in the course of deployment of a respective bay of the truss structure. Just prior to a batten frame leaving the elevator screw the next batten of the folded truss structure is pulled onto and engaged with the elevator screw.

Rotation of the lead screws are controlled by a single drive motor. The output shaft of the drive motor is coupled to a gearing and interconnect arrangement that is coupled to each of the lead screws and is retained by a baseplate from which the elongated tubular support members extend. Operation of the motor drives the gearing and interconnect arrangement, so as to cause synchronized rotation of each of the lead screws and the elevator screws engaged thereby, thereby sequentially deploying successively adjacent bays of the truss structure.

Prior to deployment of the truss structure the folded assembly is stored by a compressive load from a tensioned cable seating each batten to the adjacent battens at the cup cones. This load allows the stowed truss system to tolerate and transfer inertial loads generated by its own mass and those of payloads attached to each bay to its mounting point at its base. This capability allows the deployment device to be sized for only its deployment functions and not to tolerate the loads of the truss under dynamic loads.

BRIEF DESCRIPTION OF THE DRAWINGS

FIG. 3 is a perspective view of a partially deployed configuration of the rectilinear truss structure of the invention;

FIG. 4 is a diagrammatic front view of a batten in its collapsed or stowed condition in the truss structure of the invention;

DETAILED DESCRIPTION

Figure 1:
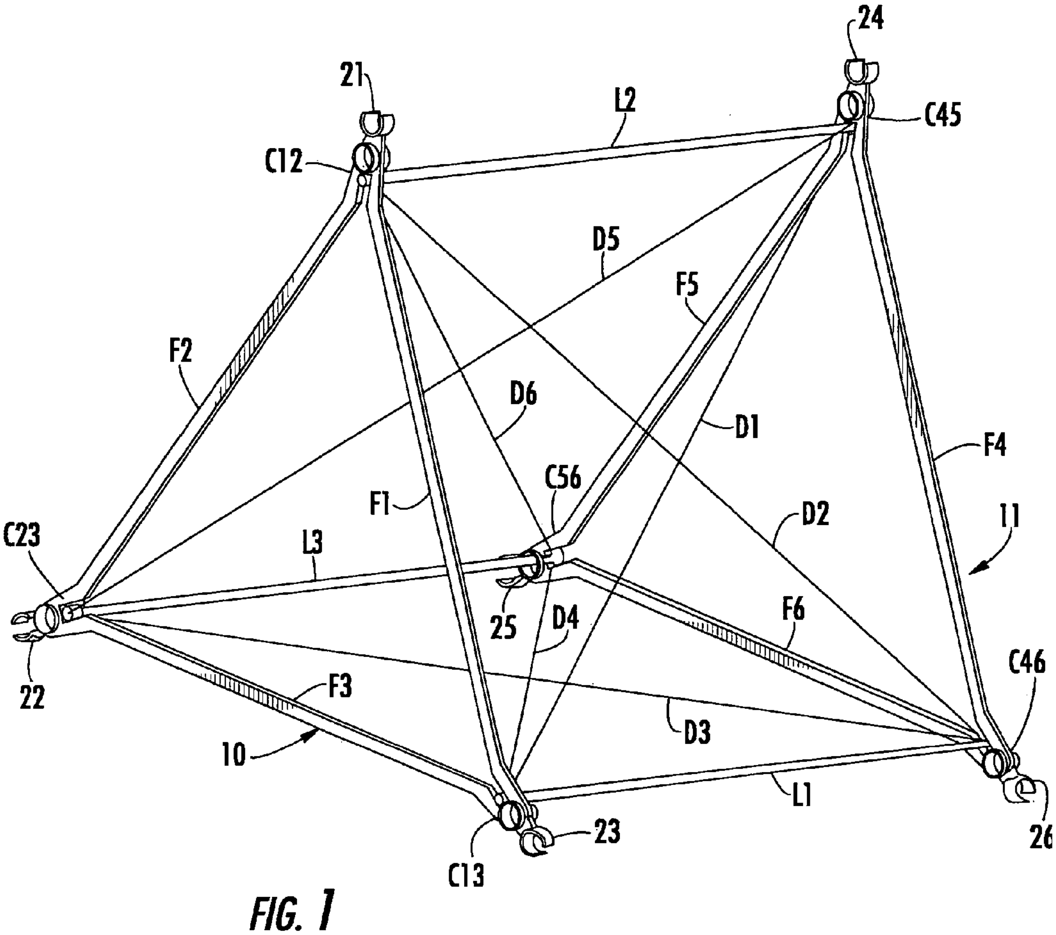
FIG. 1 is a diagrammatic perspective view of the deployed configuration of an individual bay of the truss of the present invention.
Figure 2:
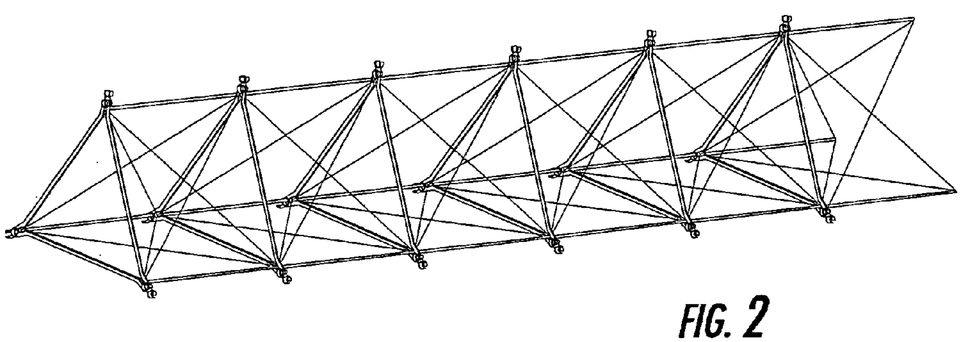
FIG. 2 is partial perspective view of the deployed configuration of multiple bays of the rectilinear truss structure of the invention.

Attention is initially directed to FIG. 1, which is a diagrammatic perspective view of the deployed configuration of an individual bay of the truss of the present invention. As described briefly above, and as further shown in the partial perspective view of FIG. 2, the rectilinear truss structure of the invention is comprised of a plurality of such bays that are sequentially interconnected with one another by means of sets of hinged longerons, which are foldable between successive battens of the truss. More particularly, as shown in FIG. 1, the ends of a respective truss bay are defined by a pair of multi-sided, rigid frames or battens 10 and 11. In accordance with a non-limiting, but preferred embodiment, each batten is preferably formed as a laminate of layers of graphite composite material and has a generally triangular configuration. It should be observed, however, that other materials and geometries may be employed without departing from the invention. The use of a triangular configuration is a preferred geometry as it serves to limit the overall size and therefore payload weight and complexity of the bay, while providing the intended truss structure and ability to side mount components.

Triangular batten 10 is formed of three sides F1, F2 and F3, while triangular batten 11 is formed of three sides F4, F5 and F6. In accordance with a preferred embodiment, each of the sides of a respective batten has the same length, so that the geometry of a respective batten is essentially that of an equilateral triangle. Battens 10 and 11 are connected with one another by three parallel and foldable/hinged tubular or hollow rod-shaped longerons L1, L2 and L3, that connect like corners regions of the battens with one another. In particular, longeron L1 connects corner C13 formed at the intersection of sides F1 and F3 of batten 10 with corner C46 formed at the intersection of sides F4 and F6 of batten 11. Longeron L2 connects corner C12 formed at the intersection of sides F1 and F2 of batten 10 with corner C45 formed at the intersection of sides F4 and F5 of batten 11. Likewise, longeron L3 connects corner C23 formed at the intersection of sides F2 and F3 of batten 10 with corner C56 formed at the intersection of sides F5 and F6 of batten 11. Like battens 10 and 11, the longerons are preferably made of graphite composite material. In addition, the longerons are hinged at their midpoints to facilitate stowage and deployment as will be described.

Also shown in FIG. 1 are three pairs of flexible diagonal rods or cords, which interconnect diagonally opposing corners of the battens. Like the battens and the longerons, the diagonals are preferably made of graphite composite material. As shown in the perspective view of FIG. 3 and the diagrammatic front view of FIG. 4, in the collapsed or stowed condition of the truss, the hinged longerons are effectively folded ‘in-half’, and the diagonal cords relax between the sides of the battens; in the deployed condition of the truss (FIGS. 1 and 2), the longerons unfold to their full lengths and the diagonals are placed in tension and are generally located within the confines of respective rectangles defined by opposing pairs of batten sides and longerons therebetween.

In particular, a diagonal D1 connects corner C13 of batten 10 with diagonally opposite corner C45 of batten 11; while diagonal D2, which crosses diagonal D1, connects corner C12 of batten 10 with corner C46 of batten 11. Similarly, diagonal D3 connects corner C23 of batten 10 with diagonally opposite corner C46 of batten 11; and diagonal D4, which crosses diagonal D3, connects corner C13 of batten 10 with corner C56 of batten 11. Likewise, diagonal D5 connects corner C23 of batten 10 with diagonally opposite corner C45 of batten 11; and diagonal D6, which crosses diagonal D5, connects corner C12 of batten 10 with corner C56 of batten 11.

Figure 5:
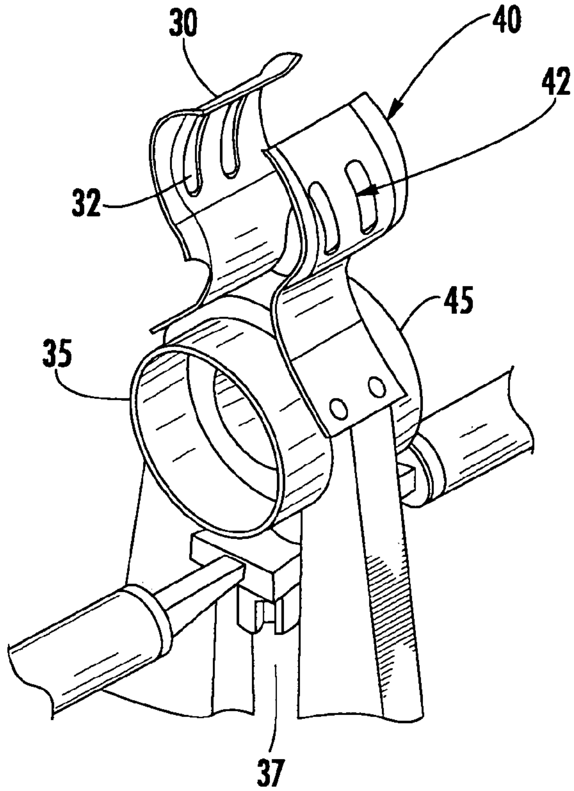
FIG. 5 is an enlarged partial perspective view of the distal portion of the corner region of a respective batten of the truss structure of the invention.

As described earlier, and as shown generally at 21–26 in FIG. 1 and in enlarged detail in the partial perspective view of FIG. 5, the distal portion of the corner region of a respective batten contains a pair of mutually opposing, generally C-shaped, flexible clamps 30 and 40. These clamps are sized to flexibly engage and be slidable along the outer surface of a generally round structural tube 50 in the stowed configuration of the truss, and to engage threads of an elevator screw 60, which extends axially outwardly from the stowage tube in the course of deployment of the truss. For this purpose, the C-clamps 30, 40 are provided with sets of thread slots 32 and 42, respectively, that are sized and shaped to conform with and engage the threads of the elevator screw 60.

Figure 6:
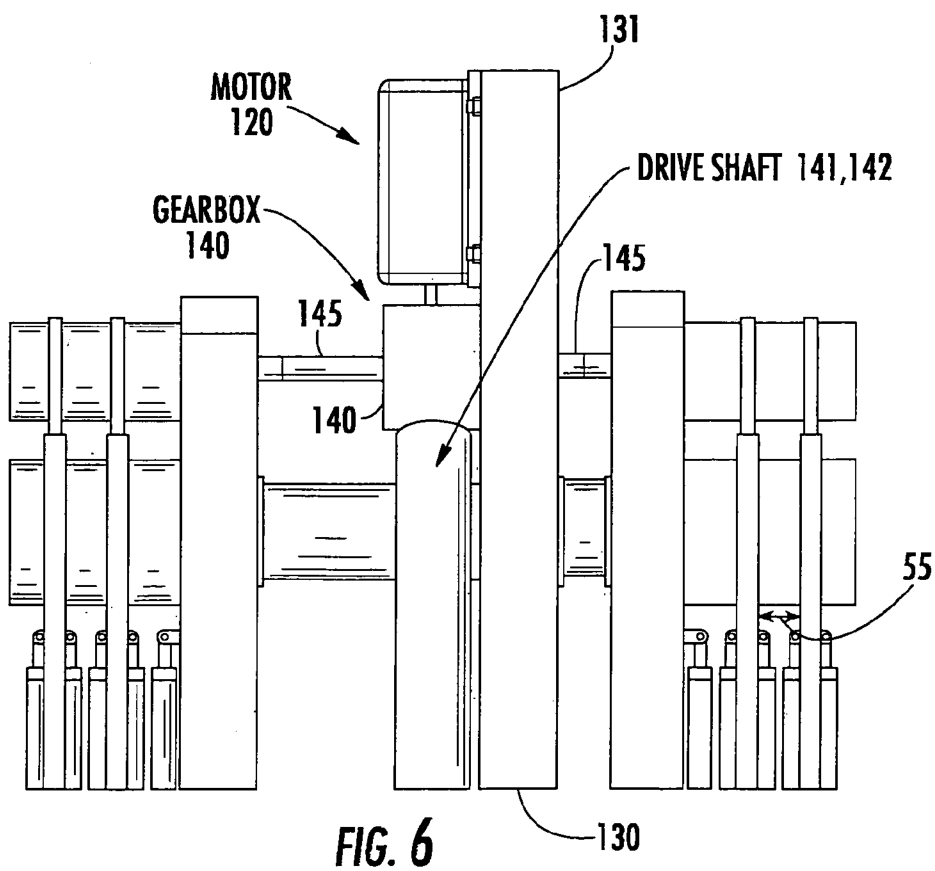
FIG. 6 is a partial side view of the stowed configuration of the truss structure of the invention showing cup cone assemblies that provide separation and load transfer prior to deployment between sequentially adjacent battens.
Figure 7:
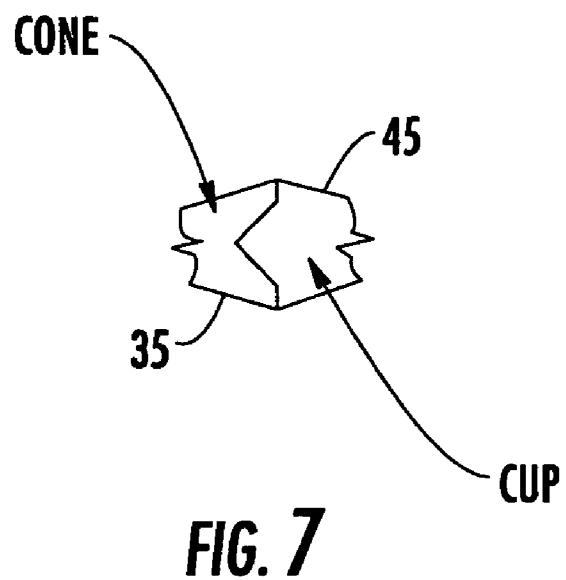
FIG. 7 diagrammatically illustrates a cone-cup shape for the stand-offs of FIG. 6.

Disposed adjacent to the C-clamps are respective tubular shaped stand-offs 35 and 45. As shown in the partial side view of FIG. 6, these stand-offs are sized to provide a prescribed separation 55 between sequentially adjacent battens in the stowed configuration of the truss. As further shown in FIG. 7, in order to facilitate mutual engagement therebetween, one of the mutually facing pair of stand-offs (cup cone) may have a generally cone configuration, while the other stand-off may have a generally cup configuration complementary to the cone configuration of its opposing stand-off.

Figure 8:
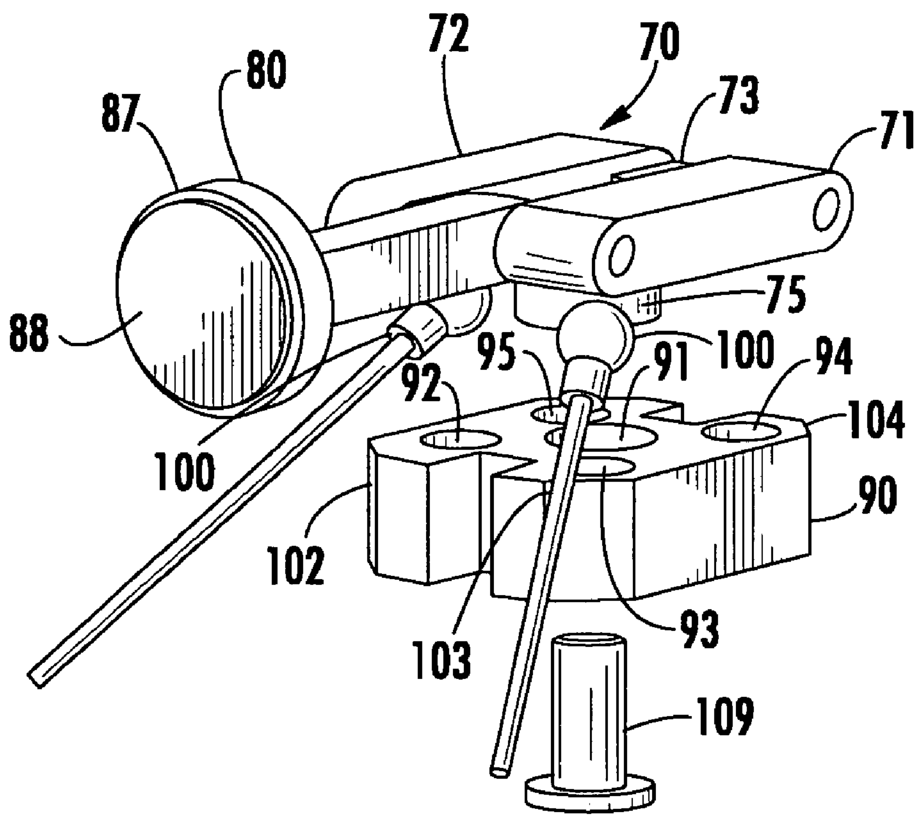
FIGS. 8 and 9 are diagrammatic perspective views of a corner fitting installable at a corner region of a batten of the truss structure of the invention.
Figure 9:
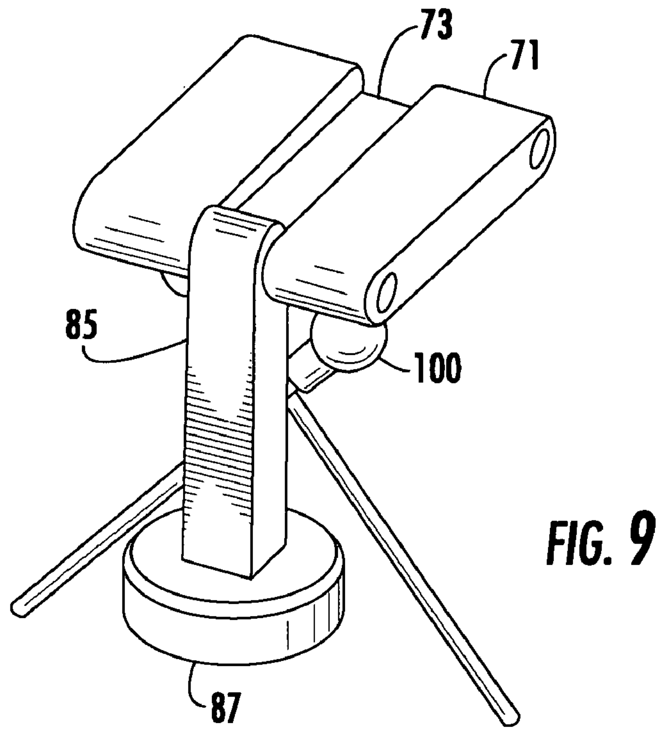

In order to connect the hinged longerons and the flexible diagonals to the battens, a respective corner region of a batten has a generally elongated slot, shown at 37 in FIG. 5. This slot is sized to receive a corner fitting 70, depicted in perspective in FIG. 8. As shown therein, a respective corner fitting 70 has a clevis 71 that is sized to fit and be captured within the slot 37, by means of screws and the like. The clevis includes a pair of opposite slots 72 and 73, that are sized to receive longeron end-fittings 80, one of which is shown in FIG. 8. Bores 82 and 83 are formed in the clevis 71 and are sized to receive pins that pass through corresponding bores (not shown) in shaft portions 85 of the longeron end-fittings, so as to allow the longerons to pivot about the axes of the bores, as shown as FIG. 9. The shaft portion 85 of a respective longeron end-fitting terminates at a disc portion 87 of the longeron end-fitting. The disc portion 87 of a longeron end-fitting has a generally circular mesa portion 88, that is sized to fit within and be bonded to the open end of a longeron, thereby pivotally capturing an end of a longeron at a corner region of a batten.

As further shown in FIG. 8, a respective corner fitting further includes a ball seat element 90, having a central aperture 91 that receives a boss 75 of the corner fitting 70. The ball seat element 90 includes a set of four corner apertures 92–95 that are sized to receive associated ball-shaped fittings 100 terminating respective ends of the diagonal cords. A ball seat element 90 further includes a set of four diagonal cord guide slots 102–105 that extend between the outer surface of the ball seat element and the corner apertures 92–95 thereof. The diagonal cord guide slots 102–105 serve to allow for the proper orientation of the distal ends of the diagonal cords for the stowed and deployed configurations of the battens. A fastener 109, such as a screw or the like is used to secure the ball seat element 90 to the corner fitting 70.

Figure 10:
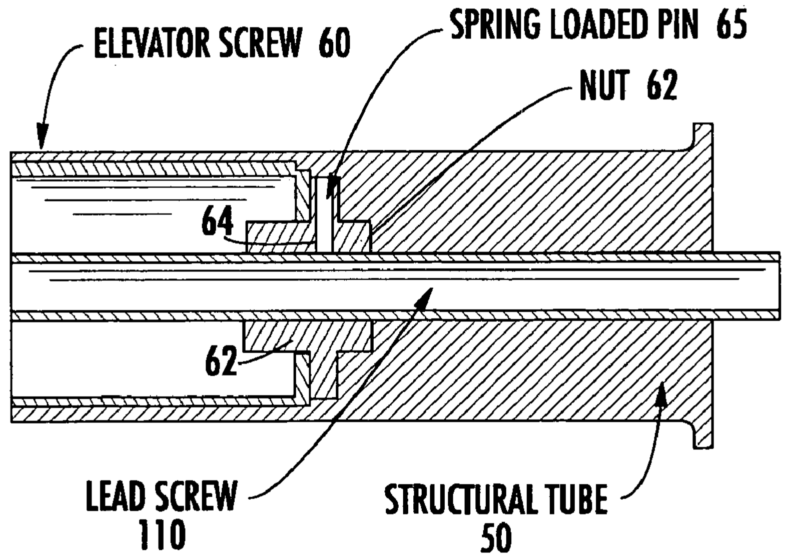
FIG. 10 is a partial side view diagrammatically illustrating the configuration of an elevator and lead screw arrangement as retained within a stowage tube of the truss structure of the invention.

As pointed out briefly above, deployment of a respective batten is accomplished by means of an elevator screw that becomes engaged by the pairs of C-clamps at the distal ends of the corner regions of the batten. As shown in FIG. 10, the elevator screw 60 is retained within and is coaxial with structural tube 50. An interior end 61 of the elevator screw is terminated by a nut 62 having a threaded bore 63 that is coaxial with the elevator screw 60. A lead screw 110, in the form of a hollow rod with a threaded exterior surface, engages the threads of the nut 62 of the elevator screw, such that rotation of the lead screw 110 may cause rectilinear travel of the elevator screw 60 along the interior of the structural tube 50.

The nut 62 has a radial bore 64 that contains a spring-loaded pin 65. This pin is sized to engage an associated detent in the lead screw 110, when the elevator screw has been translated to its outermost extension position from the structural tube 50, making the elevator screw solid with, or slaved to, the lead screw at this point in the travel of the elevator screw. This outermost extension position of the elevator screw 60 is slightly longer than the length of a respective truss bay, so that a bay may acquire its deployed configuration as its two end battens engage the elevator screw. Once the elevator screw 60 becomes slaved to the lead screw 110, rotation of the elevator screw 60 will cause an associated rotation of the elevator screw. This, in turn, will cause outward translation of a batten, whose C-clamps engage the elevator screw.

Figure 11:
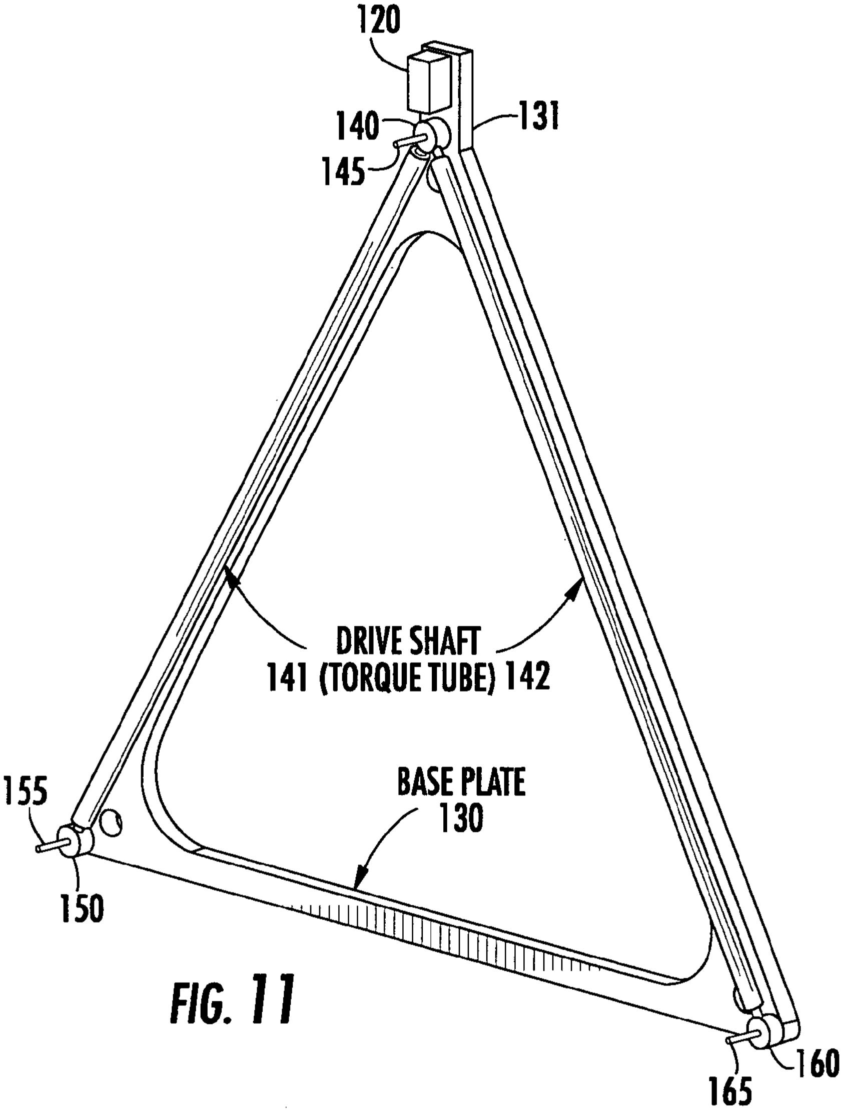
FIG. 11 is a diagrammatic perspective view of the coupling of a drive motor to respective lead screws at corner locations of a base plate of the truss structure of the invention.
Figure 12:
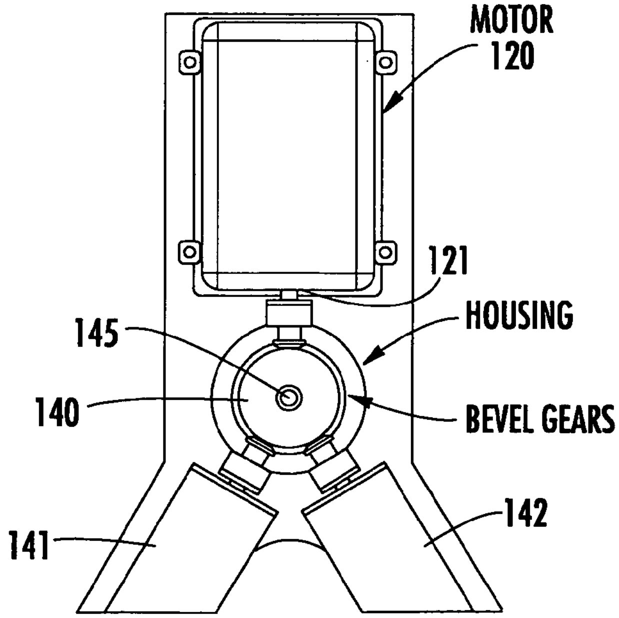
FIG. 12 is an enlarged partial end view of the gear arrangement coupling of the output shaft of the drive motor of FIG. 11 to lead screw-driving torque tubes.

As shown in FIG. 11, rotation of the lead screw 110 is accomplished by means of a motor 120, which is mounted to a corner region 131 of a base plate 130. As further shown in enlarged detail in the partial end view of the motor mount in FIG. 12, the output shaft 121 of motor 120 is coupled to a gear arrangement 140 which, in turn is coupled to a pair of drive shafts (torque tubes) 141 and 142, which are terminated at distal ends thereof by means of gearing arrangements 150 and 160. The gear arrangements 140, 150 and 160 have respective output shafts 145, 155 and 165 that serve as lead screws described above.

Figure 13:
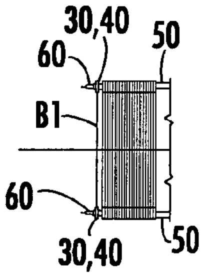
FIGS. 13–17 diagrammatically illustrate the sequential manner in which the truss structure of the invention is deployed from its stowed configuration.
Figure 16:
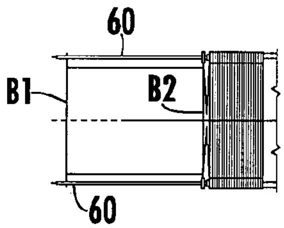
Figure 17:
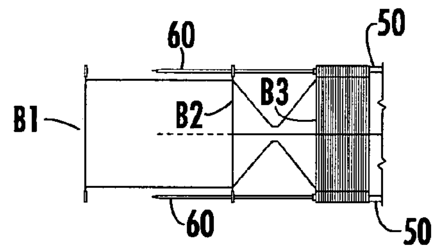
Figure 18:
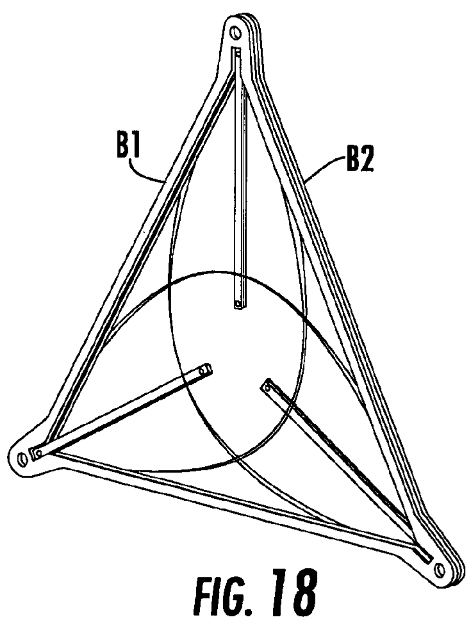
FIGS. 18 and 19 are respective perspective views of a pair of battens in their collapsed and partially deployed states, respectively.

The manner in which the truss structure of the invention is deployed from its stowed configuration is diagrammatically illustrated in FIGS. 13–17. FIG. 13 shows the truss structure in its stowed or fully retracted configuration, wherein the elevator screw 60 projects slightly beyond the outer end of the structural tube 50 and is engaged by the C-clamps 30, 40 of a first or outermost batten B1. The diagrammatic perspective view of FIG. 18 shows the manner in which a pair of battens B1 and B2 and the interconnecting longerons and diagonals thereof are collapsed in a juxtaposed manner. In this stowed configuration, the C-clamps of the remaining battens engage the outer surface of the structural tube 50. To begin sequential deployment of the bays of the truss, drive motor 120 is energized.

Figure 14:
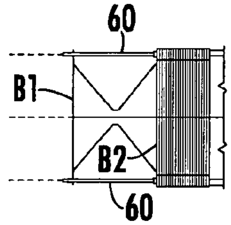
Figure 19:
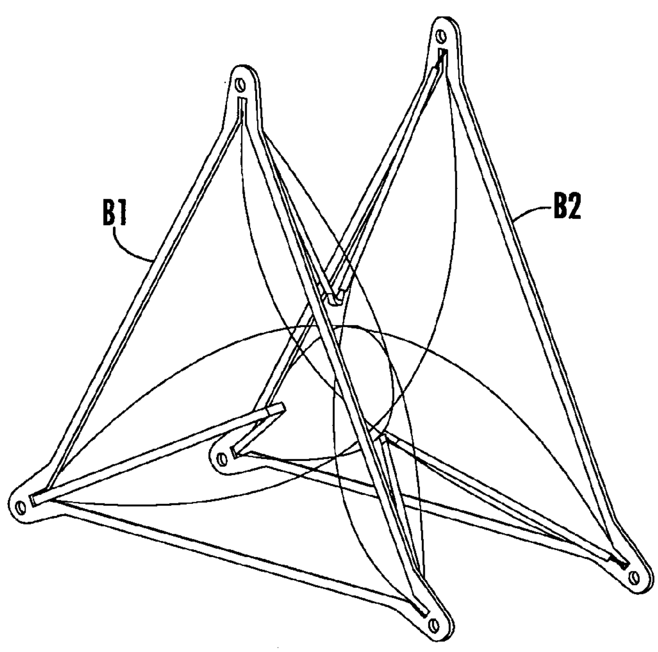

Operation of the drive motor 120 causes its drive shaft and associated gear arrangements 140, 150 and 160 described above to rotate the drive shafts/lead screws 145, 155 and 165. As the lead screws are rotated by the operation of the motor 120, their associated elevator screws 60 are translated axially outwardly away from the stowed set of battens, thereby translating the outermost batten B1 away from the stowed stack, causing partial deployment of the first truss bay, as shown in FIG. 14, and in the diagrammatic perspective view of FIG. 19 for the pair of battens B1 and B2.

Figure 15:
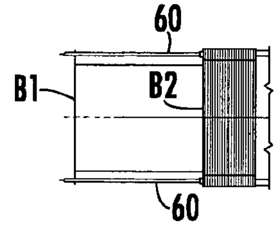

Eventually, as shown in FIG. 15, the outermost batten B1 becomes translated sufficiently to cause complete deployment of the first bay to the condition shown in FIG. 1, described above, with the C-clamps of the outermost batten B1 being positioned adjacent to the distal ends of the elevator screws 60, and the C-clamps of the next batten B2 still being retained on the structural tube 50. At this point the elevator screws 60 become solid with the lead screws, so that further rotation of the lead screws will cause rotation, rather than translation, of the elevator screws.

Next, as shown in FIG. 16, as the elevator screws are further rotated by the rotation of the lead screws to which they are slaved, they translate the first bay closer to the outermost ends of the elevator screws. This translation of the first bay and thereby the second batten B2 thereof (which serves as the outermost batten of the second bay) serves to deploy the second truss bay, as the second batten B2 is translated off the structural tube 50. The C-clamps of the second batten B2 now engage the threads of the rotating elevator screws 60. Next, as shown in FIG. 17, further rotation of the lead screws and elevator screws slaved thereto cause the outermost batten B1 to axially depart from the distal ends of the elevator screws, as the second batten B2 is translated along the elevator screws, partially deploying the second bay of the truss.

With further rotation of the elevator screws, the second bay becomes fully deployed, and the third bay will begin to deploy. Next, the batten B2 that interconnects the first and second bays will axially depart from the distal ends of the elevator screws, in the same manner as the outermost batten B1, as described above, and the above sequence of events will continue until all of the bays have been fully deployed.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. A boom structure that is deployable from a collapsed, stowable configuration to an elongated truss configuration, comprising a plurality of truss-forming multi-sided bays, a respective one of which contains a pair of battens joined together at corresponding corner regions thereof by foldable longerons therebetween, and wherein a respective side of a bay contains a plurality of diagonal cord members crossing one another and connected to diagonally opposed corner regions of said respective side, such that when said foldable longerons are in their folded positions, said battens are nested together against one another in a stacked arrangement and said diagonal cord members flex into a compact stowed configuration between adjacent battens; and wherein a corner region of a batten includes clamping members that are configured to engage an elongated structural tube in the stowed configuration of said boom structure and, in the course of deployment of said boom structure outwardly from its stowed configuration, said clamping members travel along and leave said elongated structural tube, and engage threads of an elongated threaded shaft that is coaxial with and extends outwardly from said elongated structural tube.

2. The boom structure according to claim 1, wherein said elongated threaded shaft comprises an elevator screw that is coaxial with an elongated lead screw, said elongated lead screw passing through said elongated structural tube, such that rotation of said elongated lead screw causes linear travel of said elevator screw over a prescribed distance, sufficient to deploy one bay of said boom structure, whereupon said elongated lead screw becomes fixedly engaged with said elevator screw, so that further rotation of said elongated lead screw causes rotation of said elevator screw therewith, and clamping members that engage said elevator screw travel along therealong until they leave said elevator screw in the course of deployment of a respective bay of said boom structure.

3. The boom structure according to claim 2, further comprising a drive motor and a gearing and interconnect arrangement retained by a baseplate from which elongated structural tubes extend, said gearing and interconnect arrangement engaging an output shaft of said drive motor and respective lead screws that pass through said battens, whereby operation of said motor drives said gearing and interconnect arrangement so as to cause rotation of said lead screws and said elevator screws engaged thereby, and sequentially deploy successively adjacent bays of said boom structure.

4. A space-deployable, elongated truss structure comprising:

a base member from which extend a plurality of spaced apart elongated structural tubes, each elongated structural tube containing an elevator screw extendable therefrom;

a plurality of truss-forming multi-sided bays, supported by said elongated structural tubes, and being coupled to elevator screws extending from said elongated structural tubes, a respective bay containing a pair of battens joined together at corresponding corner regions thereof by foldable longerons therebetween, such that when said foldable longerons are in their folded positions, said battens are nested together against one another in a stacked arrangement along said elongated structural tubes; and a drive motor coupled to simultaneously drive each elevator screw, so as to sequentially deploy said plurality of truss-forming multi-sided bays.

5. The space-deployable, elongated truss structure according to claim 4, wherein a corner region of a batten includes clamping members that are configured to engage said elongated structural tubes in the stowed configuration of said boom structure and, in the course of deployment of said boom structure outwardly from its stowed configuration, said clamping members travel along and leave said elongated structural tubes, and engage threads of said elevator screw.

6. The space-deployable, elongated truss structure according to claim 5, wherein said elevator screw is coaxial with an elongated lead screw, said elongated lead screw passing through said elongated structural tube, such that rotation of said elongated lead screw causes linear travel of said elevator screw over a prescribed distance, sufficient to deploy one bay of said boom structure, whereupon said elongated lead screw becomes fixedly engaged with said elevator screw, so that further rotation of said elongated lead screw causes rotation of said elevator screw therewith, and clamping members that engage said elevator screw travel along therealong until they leave said elevator screw in the course of deployment of a respective bay of said boom structure.

7. The space-deployable, elongated truss structure according to claim 4, wherein a respective side of a bay contains a plurality of diagonal cord members crossing one another and connected to diagonally opposed corner regions of said respective side, such that when said foldable longerons are in their folded positions, said battens are nested together against one another in a stacked arrangement and said diagonal cord members flex into a compact stowed configuration between adjacent battens.

8. The space-deployable, elongated truss structure according to claim 4, further comprising cup cone members that allow compression of adjacent bay corners together to form a load carrying structure when stowed capable of reacting it's own inertial loads and those dumped into the stowed structure at each of its battens.

9. The space-deployable, elongated truss structure according to claim 4, which is adapted to allow for attachment ot payloads to each bay in all configurations, stowed, deploying and deployed.

10. The space-deployable, elongated truss structure according to claim 4, wherein all preloaded elements are effective to eliminate a dead band within the deployed structure.

11. The space-deployable, elongated truss structure according to claim 4, that is configured to undergo no rotation in any fashion about its axial centerline during deployment.

12. The space-deployable, elongated truss structure according to claim 4, wherein the base of the truss is mounted directly to said base member without moving tables or lazy susans therebetween.

13. A method of deploying a boom structure comprising the steps of:

(a) providing a plurality of truss-forming, multi-sided bays, a respective bay containing a pair of battens joined together by foldable longerons therebetween, and wherein a respective side of a bay contains a plurality of diagonal cord members crossing one another and connected to diagonally opposed corner regions of said respective side, such that when said foldable longerons are in their folded positions, said battens are nested together against one another in a stacked arrangement and said diagonal cord members flex into a compact stowed configuration between adjacent battens;

(b) nesting said plurality of truss-forming, multi-sided bays in a stacked arrangement along elongated support members; and (c) sequentially translating said plurality of truss-forming, multi-sided bays away from said stacked arrangement and off said elongated support members, so as to sequentially deploy said plurality of truss-forming multi-sided bays.

14. The method according to claim 13, wherein a corner region of a batten includes clamping members that are configured to engage an elongated structural tube in the stowed configuration of said boom structure and, in the course of deployment of said boom structure in step (c) outwardly from its stowed configuration, said clamping members travel along and leave said elongated structural tube, and engage threads of an elongated threaded shaft that is coaxial with and extends outwardly from said elongated structural tube.

15. The method according to claim 14, wherein said elongated threaded shaft comprises an elevator screw that is coaxial with an elongated lead screw, said elongated lead screw passing through said elongated structural tube, such that rotation of said elongated lead screw causes linear travel of said elevator screw over a prescribed distance, sufficient to deploy one bay of said boom structure, whereupon said elongated lead screw becomes fixedly engaged with said elevator screw, so that further rotation of said elongated lead screw causes rotation of said elevator screw therewith, and clamping members that engage said elevator screw travel along therealong until they leave said elevator screw in the course of deployment of a respective bay of said boom structure.

16. The method according to claim 15, wherein step (c) comprises coupling the output shaft of a drive motor to respective lead screws that pass through said battens, and operating said drive motor so as to cause rotation of said lead screws and said elevator screws engaged thereby, and sequentially deploy successively adjacent bays of said boom structure.

* * * * *

UNITED STATES PATENT AND TRADEMARK OFFICE

CERTIFICATE OF CORRECTION

PATENT NO. : 6,970,143 B2
APPLICATION NO. : 10/801995
DATED : November 29, 2005
INVENTOR(S) : Allen et al.

It is certified that error appears in the above-identified patent and that said Letters Patent is hereby corrected as shown below:

| | |
|---|---|
| Column 1, line 6 | Insert: --<u>GOVERNMENT LICENSE RIGHTS</u> The U.S. Government has a paid-up license in this invention and the right in limited circumstances to require the patent owner to license others on reasonable terms as provided for by the terms of Government Contract No: F30602-020-C-0012.-- |
| Column 1, line 65 | Delete: "connected to"<br>Insert: --are connected to-- |
| Column 2, line 50 | Delete: "is partial"<br>Insert: --is a partial-- |
| Column 3, Line 54 | Delete: "corners regions"<br>Insert: --corner regions-- |
| Column 4, Line 56 | Delete: "perspective in"<br>Insert: --perspective view in-- |
| Column 7, Line 23 | Delete: "along therealong"<br>Insert: --therealong-- |
| Column 8, Line 9 | Delete: "travel along the-"<br>Insert: --travel therealong-- |
| Column 8, Line 10 | Delete: realong until"<br>Insert: --until-- |
| Column 8, Line 27 | Delete: "attachment ot"<br>Insert: --attachment of-- |

UNITED STATES PATENT AND TRADEMARK OFFICE

CERTIFICATE OF CORRECTION

PATENT NO. : 6,970,143 B2
APPLICATION NO. : 10/801995
DATED : November 29, 2005
INVENTOR(S) : Allen et al.

It is certified that error appears in the above-identified patent and that said Letters Patent is hereby corrected as shown below:

Column 9, Line 3 Delete: “travel along”
Insert: --travel therealong--

Signed and Sealed this

Twenty-ninth Day of August, 2006

JON W. DUDAS
*Director of the United States Patent and Trademark Office*

UNITED STATES PATENT AND TRADEMARK OFFICE

CERTIFICATE OF CORRECTION

PATENT NO. : 6,970,143 B2
APPLICATION NO. : 10/801995
DATED : November 29, 2005
INVENTOR(S) : Allen et al.

It is certified that error appears in the above-identified patent and that said Letters Patent is hereby corrected as shown below:

| | |
|---|---|
| Title Page Item (73) | Delete: "Assignee: Harris Corporation, Melbourne, FL (US)" Insert: --Assignee: Harris Corporation, Melbourne, FL (US); Starsys Research Corporation, Boulder, CO (US)-- |

Signed and Sealed this

Twenty-ninth Day of May, 2007

JON W. DUDAS

*Director of the United States Patent and Trademark Office*